US 12,055,017 B2

United States Patent
Al-Hajri et al.

(10) Patent No.: US 12,055,017 B2
(45) Date of Patent: Aug. 6, 2024

(54) CHEMICAL HYDROSTATIC BACKPRESSURE REDUCTION METHODOLOGY TO FLOW FLUIDS THROUGH DISPOSAL WELLS

(71) Applicant: Saudi Arabian Oil Company, Dhahran (SA)

(72) Inventors: Nasser Mubarak Al-Hajri, Abqaiq (SA); Abdulaziz Essam AlDughaither, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/970,057

(22) Filed: Oct. 20, 2022

(65) Prior Publication Data

US 2023/0132097 A1 Apr. 27, 2023

Related U.S. Application Data

(60) Provisional application No. 63/271,455, filed on Oct. 25, 2021.

(51) Int. Cl.
*E21B 41/00* (2006.01)
*C09K 8/84* (2006.01)
(Continued)

(52) U.S. Cl.
CPC .......... *E21B 41/0057* (2013.01); *C09K 8/845* (2013.01); *C09K 8/86* (2013.01); *E21B 47/04* (2013.01); *E21B 47/06* (2013.01)

(58) Field of Classification Search
CPC ...... E21B 41/0057; E21B 47/06; E21B 43/12; E21B 43/385; E21B 47/04; E21B 49/008; E21B 2200/20; E21B 41/00
See application file for complete search history.

(56) References Cited

U.S. PATENT DOCUMENTS 6,002,063 A 12/1999 Bilak et al.
9,085,975 B2 7/2015 Abad
(Continued)

FOREIGN PATENT DOCUMENTS

CA 2751874 A1 * 9/2010 ......... E21B 41/0064
WO WO-2020113333 A1 * 6/2020

OTHER PUBLICATIONS

PCT International Search Report and Written Opinion in International Appln. No. PCT/US2022/078590, dated Feb. 22, 2023, 14 pages.

(Continued)

*Primary Examiner* — Zakiya W Bates
(74) *Attorney, Agent, or Firm* — Fish & Richardson P.C.

(57) ABSTRACT

To control hydrostatic backpressure of disposal wells connected to a disposal plant surface network, density of water to be injected from a water disposal plant system into disposal wells formed in a subterranean zone, a density of a hydrostatic backpressure-modifying additive to modify a density of the water, a target total injection flow rate of the water, and a vertical depth of a portion of the subterranean zone through which the water is to be injected are identified. Injected water flow rate upstream of an injection point into the multiple disposal wells, wellhead injection pressure needed to achieve the target total injection flow rate and a total injection rate are periodically received. Based on these parameters, dosage rate of the additive to maintain the target total injection flow rate is periodically determined. An additive quantity is injected into the water and periodically modified based on the periodically determined dosage rate.

7 Claims, 4 Drawing Sheets

(51) Int. Cl.
  *C09K 8/86*     (2006.01)
  *E21B 47/04*    (2012.01)
  *E21B 47/06*    (2012.01)

(56) References Cited

U.S. PATENT DOCUMENTS

| | | |
|---|---|---|
| 10,180,036 B2 | 1/2019 | Blackwell et al. |
| 2002/0033278 A1 | 3/2002 | Reddoch |
| 2013/0240210 A1 | 9/2013 | Yale et al. |
| 2014/0278112 A1* | 9/2014 | Nelson .................. G01V 20/00 702/6 |
| 2017/0335642 A1 | 11/2017 | Blackwell et al. |

OTHER PUBLICATIONS

Al-Hajri et al., "Forecasting the Reliability of a Wastewater Disposal System and Predicting Future Corrective Actions using Hydraulic Simulation," SPE-177488-MS, OnePetro, Paper presented at the Abu Dhabi International Petroleum Exhibition and Conference, Abu Dhabi, UAE, Nov. 2015, 11 pages.

Pagel et al., "Rducing Backpressure and Enhancing Throughput of Saltwater Disposal Wells with Chlorine Dioxide and Complex Nano Fluids: Optimization and Case Studies," SPE-193629-MS, OnePetro, Paper presented at the SPE International Conference on Oilfield Chemistry, Galveston, Texas, USA, Apr. 2019, 11 pages.

\* cited by examiner

CHEMICAL HYDROSTATIC BACKPRESSURE REDUCTION METHODOLOGY TO FLOW FLUIDS THROUGH DISPOSAL WELLS

CROSS-REFERENCE TO RELATED APPLICATION

This application claims the benefit of priority to U.S. Provisional Patent Application No. 63/271,455, filed on Oct. 25, 2021, which is hereby incorporated by reference in its entirety.

TECHNICAL FIELD

This disclosure relates to fluid flow through wellbores and, specifically, to controlling hydrostatic backpressure of the fluid flow in wellbores.

BACKGROUND

Petroleum wells are often used as disposal wells to dispose waste fluids. Such wells are often dedicated wells drilled for the purpose of collecting waste fluids. The waste fluid may be fluid that was released from the subterranean zone during well operations such as drilling to form wellbores or production through formed wellbores. The waste fluid needs to be driven out of the subterranean zone into the disposal wells. Alternatively or in addition, the waste fluid may be fluid that separated from an oil or gas facility as part of a plant process. To do so, a disposal plant is installed on the surface, and a well system, for example, a network of wells (for example, disposal wells), is formed around the disposal plant. Water is pumped, for example, using one or more disposal pumps installed at the disposal plant, through the disposal wells and into the subterranean zone (also known as the disposal zone). The pumped water drives the waste fluid towards and into the network of disposal wells. The disposal plant includes multiple fluidically coupled flow equipment. An effectiveness of the disposal plant to flow water or other fluid through the network of disposal wells, and ultimately drive waste fluid out of the subterranean zone depends, in part, on wellbore formation damage, reservoir pressure and injection water hydrostatic backpressure.

SUMMARY

This disclosure relates to controlling hydrostatic backpressure of disposal wells in an injection disposal plant surface network, for example, using chemical additives that can change the hydrostatic backpressure.

Certain aspects of the subject matter described here can be implemented as a method. A computer system identifies injection water density of water ($\rho_w$) to be injected from a water disposal plant system at a surface into multiple disposal wells included in the water disposal system and formed in a subterranean zone. The computer system identifies a density ($\rho_o$) of a hydrostatic backpressure-modifying additive. The additive is configured to modify a density of the water to be injected. The computer system identifies a target total injection flow rate of the water to be injected. The computer system identifies a vertical depth ($D_v$) of a portion of the subterranean zone through which the water is to be injected. While the water is being injected into the multiple disposal wells, the computer system periodically receives injected water flow rate ($q_w$) upstream of an injection point into the multiple disposal wells, wellhead injection pressure ($\Delta P_{ad}$) needed to achieve the target total injection flow rate and a total injection rate ($q_t$). Also, while the water is being injected into the multiple disposal wells, the computer system periodically determines a dosage rate ($q_O$) of the additive to maintain the target total injection flow rate using the total injection rate ($q_t$), the wellhead injection pressure ($\Delta P_{ad}$), the vertical depth ($D_v$), the injection water density ($\rho_w$) and the density ($\rho_o$) of the additive. While the water is being injected into the multiple disposal wells, a quantity of the additive injected into the water is periodically modified based on the periodically determined dosage rate.

An aspect, taken alone or in combination with any other aspect, includes the following features. The dosage rate ($q_O$) of the additive is determined using the following formula:

$$q_o = q_t \frac{\left[\dfrac{144\Delta P_{ad}}{D_v} + \rho_w - \dfrac{\rho_w q_w}{q_t}\right]}{\rho_o}.$$

An aspect, taken alone or in combination with any other aspect, includes the following features. The computer system computationally models fluid flow through the multiple disposal wells to develop the formula.

An aspect, taken alone or in combination with any other aspect, includes the following features. To computationally model the fluid flow through the multiple disposal wells, the computer system generates, for each well, a respective inflow performance curve.

An aspect, taken alone or in combination with any other aspect, includes the following features. The additive is ethylenediaminetetraacetic acid (EDTA) 30% weight solution.

An aspect, taken alone or in combination with any other aspect, includes the following features. The additive is potassium dihydrogen phosphate ($KH_2PO_4$) 80% weight solution.

An aspect, taken alone or in combination with any other aspect, includes the following features. To modify a quantity of the additive injected into the water, a valve of a flow control system is opened or closed to flow or stop a flow of the additive into the water.

Certain aspects of the subject matter described here can be implemented as a system. The system includes a flow control system and a computer system. The flow control system includes one or more flow components configured to flow water from a disposal plant system at a surface into multiple disposal wells included in the water disposal system and formed in the subterranean zone. The computer system includes one or more processors, and a computer-readable medium storing instructions executable by the one or more processors to perform operations described here.

An aspect, taken alone or with any other aspect, includes the following features. The one or more flow components include a pump, a surface pipe, a flow restrictor, a wellbore tubular, a valve, or any combination of those flow components.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A disposal plant used to pump fluids, for example, water, through disposal wells includes multiple components, for example, pumps, surface pipes and restrictions, wellbore tubulars, reservoir skin or sand face, to name a few. Each component is associated with a respective pressure change (pressure drop or pressure increase) that affects that component's ability to flow fluid. For steady fluid flow at any point along the path of injected water, the upstream pressure drop and flow rate must be equal to the respective downstream pressure drop and flowrate. Thus, the overall pressure change in the disposal plant at any given flow rate is equal to the difference between the source pressure (at the disposal plant surface) and the sink pressure (pressure within the reservoir).

This disclosure describes an expansion of the concept described above to model network flow and individual well performance using computational techniques. By implementing computational nodal analysis to solve systems of equations to calculate pressure and flow rate values at any point (called node) in a flow network, well performance models and network flow models were analyzed to predict the capacity of any disposal/production system.

This disclosure also describes the application of the concept described above to modify the density of water being injected through a network of disposal wells to drive waste fluids in a subterranean zone, for example, into a disposal well (also known as a waste well). As described below, based on real-time observation of flow parameters through the disposal wells as well as properties of the reservoir and each well, a varying quantity of a density modifying additive is periodically added to the pumped water to maintain flow at a steady state and to optimize driving of the waste fluid into through each disposal well.

Figure 1:
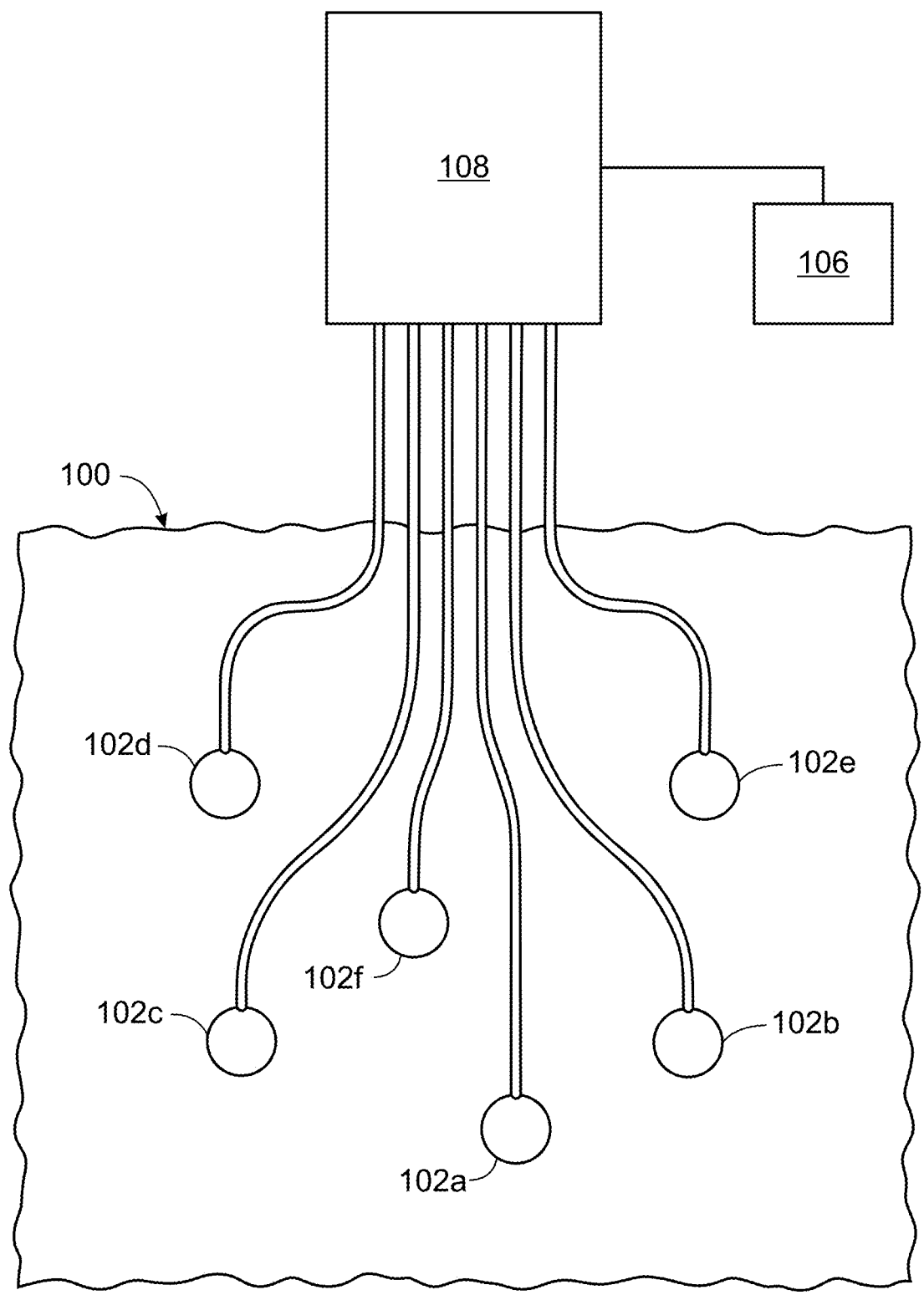
FIG. 1 is an example of a well system including a disposal plant and a network of waste disposal wells.

FIG. 1 is an example of a well system including a disposal plant 108. FIG. 1 shows a schematic aerial view of a geological formation 100 in which a well system has been formed. The well system includes multiple disposal wells (for example, disposal wells 102a-102f) formed around the disposal plant (or waste plant) 108. Each well is drilled into the formation 100 using wellbore drilling equipment (not shown). In operation, the disposal wells 102a-102f are formed in the formation 100 to inject waste fluids in the surrounding zones of the formation 100. The actual number of disposal wells 102a-102f and the pattern of the multiple disposal wells 102a-102e around the disposal plant 108 can vary.

A disposal plant 108 is installed at a surface of the formation. The disposal plant 108 is operatively coupled (including fluidically, mechanically and electrically) to each well in the well system. Fluidic coupling allows the disposal plant to flow fluids to and from each well. To do so, the disposal plant includes multiple tubulars and pipes through which fluids flow. Mechanical coupling allows the disposal plant to control the flow of the fluids through each well. For example, the disposal plant can include one or more fluidic components, such as pumps, compressors, valves and the like, that can be operated to control the flow of fluids through the multiple tubulars and pipes. Some of the components can be at the surface as part of the disposal plant 108, while others can be disposed at the surface of or within each well. Electrical coupling allows the disposal plant to transmit electrical signals to the various components to control operational parameters (for example, flow rates, valve open/close timing, and the like) of the components.

In some implementations, a controller 106, e.g., a programmable logic controller (PLC), is operatively coupled to the disposal plant 108. The controller 106 can be implemented as one or more computer systems (or one or more data processing apparatus). The computer systems can be connected to computer-readable media (for example, non-transitory computer-readable media) that store computer instructions executable by the one or more computer systems to perform operations described here. Alternatively or in addition, the controller 106 can be implemented as processing circuitry that includes electrical components (for example, capacitors, resistors and the like) or can be implemented as a combination of firmware, hardware, software or any combination of them. As described below, the controller 106 can receive flow parameters within each well of the well system or at the disposal plant (or both) and determine optimum flow conditions including, for example, a quantity of a hydrostatic backpressure reducing additive that needs to be added to the water that is flowed from the disposal plant 108 through the disposal wells 102a-102e. Details about some of the components used to couple the disposal plant 108 to the wells and the operations of the controller 106 are described below with reference to FIG. 4.

In an example operation, the disposal wells 102a-102f are formed to a determined depth in the formation 100. The disposal plant 108 pumps or injects, that is, flows at a pressure, a fluid, for example, water, through the fluidic connections into the disposal wells 102a-102f. The pumped water flows to the determined depth and enters the formation 100 through the walls of the disposal wells 102a-102f and sweeps waste fluids in the formation 100, e.g., towards another disposal well (not shown). The flow components in the disposal plant 100 control flow parameters (for example, injection rate, pressure, and the like) of the water being pumped into the disposal wells 102a-102f. In some implementations, sensors (for example, flow meters, density meters, pressure gauges, temperature sensors and the like) can be disposed throughout the well system including at the disposal plant 108 and within each well. The sensors can be operatively coupled to the controller 106 which, based on values sensed by the sensors, can transmit control instructions to the disposal plant 108 to vary the injection (or pumping) of the water through the disposal wells.

Recognizing that hydrostatic backpressure in the disposal well is a flow parameter that depends only on pumped water density and reservoir depth, the workflow 200 was implemented to evaluate the impact of the hydrostatic backpressure on the pressure of the disposal plant 108. The evaluation demonstrates that changing the disposal wells (102a-102f) hydrostatic backpressure using a chemical additive injected on the surface affects overall injection performance of the disposal plant 108. When back pressure is encountered downstream of the injection line (that is, the flowline through which the water is pumped into the disposal wells 102a-102f), the water injection rate from the disposal plant 108 is reduced. The reduced water injection rate is due to a steep increase in the reservoir pressure in the disposal wells. The reservoir pressure (also known as bottom hole pressure) increases with increasing injection rate. One technique to reduce the back pressure due to increasing reservoir pressure is to increase the density of the water injected into the reservoir. Density can be increased by adding a chemical additive (described below). By periodically measuring the hydrostatic backpressure in each of the disposal wells, a water density value that will reduce the back pressure can be periodically determined, and a quantity of the additive to be added to the water to achieve the determined water density can be determined. The determined quantity of the additive can be periodically added to the water flowed to each disposal well to control flow pressure of the injected water. An example of analyzing the well system to periodically determine the quantity of the additive is described with reference to FIG. 2.

Figure 2:
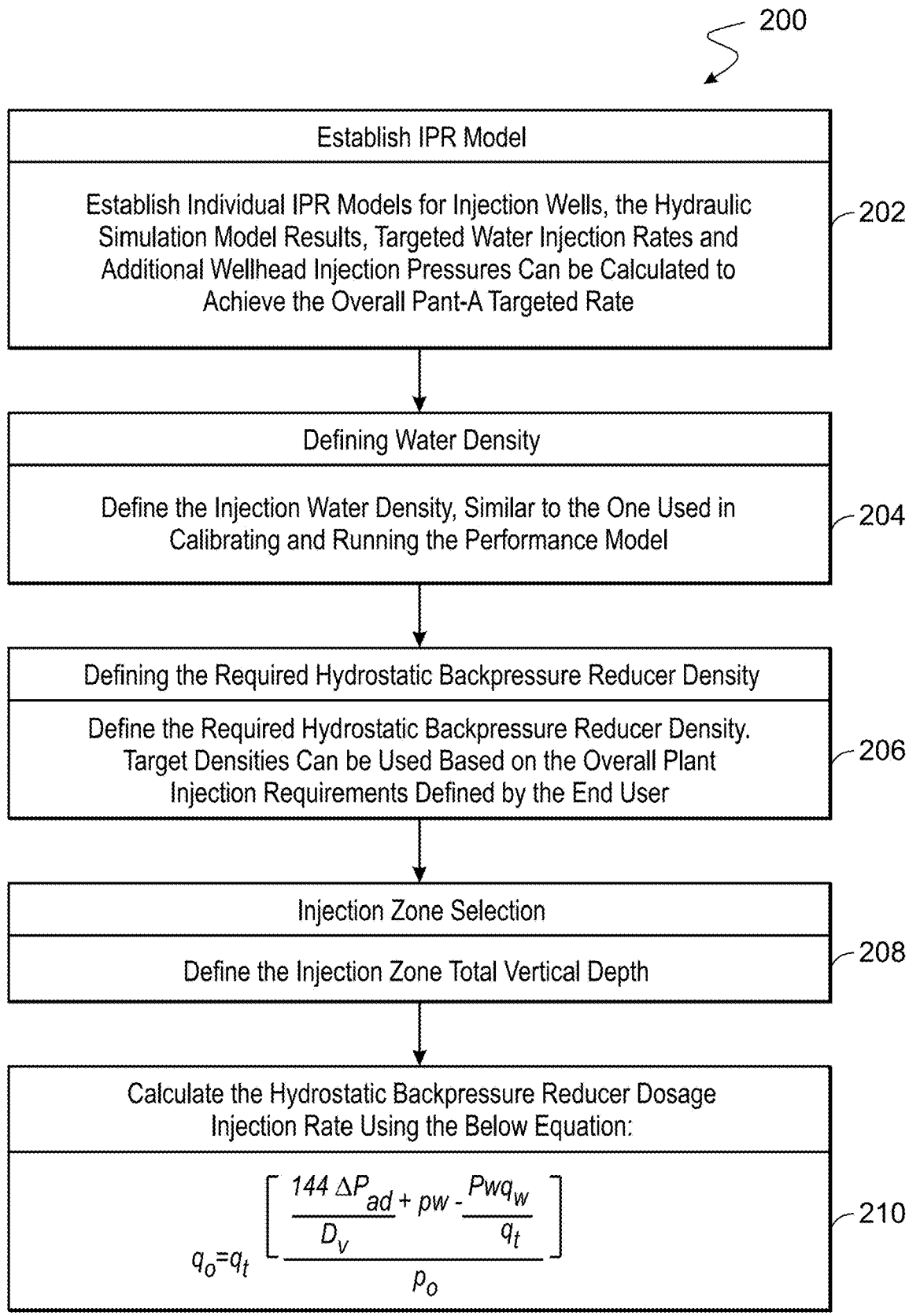
FIG. 2 is an example of a workflow to determine an injection rate of an additive added to water injected through the well system.

FIG. 2 is an example of a workflow 200 to determine an injection rate of an additive added to water injected through the well system. The workflow 200 can be implemented by one or more computer systems, which can be similar in construction but different from the computer systems included in the controller 106. The computer systems implement at least some steps of the workflow 200 by executing computational simulation programs to evaluate flow behavior of the wells in the well system described with reference to FIG. 1. The computer systems implement the workflow 200 to establish inflow performance relations of the disposal wells along with outflow performance relations to diagnose the disposal plant and the well system to identify source (or sources) of ineffective disposal of wastewater. Identifying the sources allows corrective action to be implemented.

At 202, inflow performance models (IPRs) for disposal wells is established for the disposal wells. An overall target rate is selected as an input to the computational simulation. The overall target rate is the required total volume of daily disposal rate from the disposal plant 108 to ensure plant overall process is not affected. Sometimes, oil processing facilities may need to shut down if the required disposal rate is not met. The disposal process is linked to the overall oil processing facility and any disposal bottleneck will have adverse impact. The simulation determines targeted water injection rates and additional wellhead injection parameters to satisfy the overall target rate. At 204, the injection water density is defined, that is, provided as input to the simulation, similar to the one used in calibrating and running the performance model. At 206, the required hydrostatic backpressure (HP) reducer density is defined, that is, provided as input to the simulation. Target densities can be used based on the overall disposal plant requirements defined by plant operators. At 208, the injection zone total vertical depth is defined, that is, provided as input to the simulation. The injection zone total vertical depth can be the depth of the disposal well. At 210, an HP reducer dosage injection rate is calculated based on the inputs provided to the simulation. The HP reducer dosage injection rate is the rate at which the density increasing additive is to be added to the water to maintain the overall target rate that was defined at the beginning of the simulation.

In this manner, the computer systems implement nodal analysis technique in the network hydraulic simulation. In some implementations, the scope of the analysis takes into account the historical well's injection and includes a history match of those data to the current injection capacity of those wells. The computer systems run simulations of the flow all the way from the surface network to the wellhead of each well in the well system, and then through the tubular to the reservoir (that is, the formation 100) to estimate the rates and pressures of the disposal plant 108. In the hydraulic simulation, input was provided to the computer systems to modify the injection water density and to forecast its effect on the overall injection rate. To compare the water injection performance before and after the injection water density change, injection pump pressure of the disposal plant 108 was fixed. Increasing the injection water density (measured in percentage change) showed an increase in the disposal plant injection rate (measured in barrels/day). In this manner, the simulation showed that the injection rate is sensitive to injection water density which, in turn, is affected by the hydrostatic backpressure in the individual wells. In some analyses, changing the injection water density by just 6% resulted in 10,000 barrel increase in injected water per day.

The additive to reduce water density is selected to satisfy at least the following conditions—(i) maintain water quality using a solid-free chemical, (ii) ultra-high solution density (more than twice the density of pure water) to modify the injection water density while minimizing injected chemical quantities, (iii) non-corrosive to surface pipes and downhole tubulars, (iv) having near formation damage removal additive to control the formation damage aggravation over time, and (v) compatible with injection water source to avoid any unwanted scale precipitation. Examples of suitable additives are shown in the table below.

| HP Reducer Recipe (Density = 120 lbm/ft^3 or pound mass per cubic foot) | | |
|---|---|---|
| Additive (1000 gal mixture) | Gal/1000 Gal | Remarks |
| Ethylenediaminetetraacetic Acid (EDTA) 30% wt Solution | 100 | This additive is used for iron control and near wellbore damage removal. The solution is non-corrosive and requires no acid corrosion inhibitor. |
| Potassium Dihydrogen Phosphate (KH2PO4) 80% wt Solution (Density = 128 lbm/ft^3) | 900 | Solid free density modifier additive to increase the hydrostatic backpressure of the injected water and ultimately improve the injectivity. |

Figure 3:
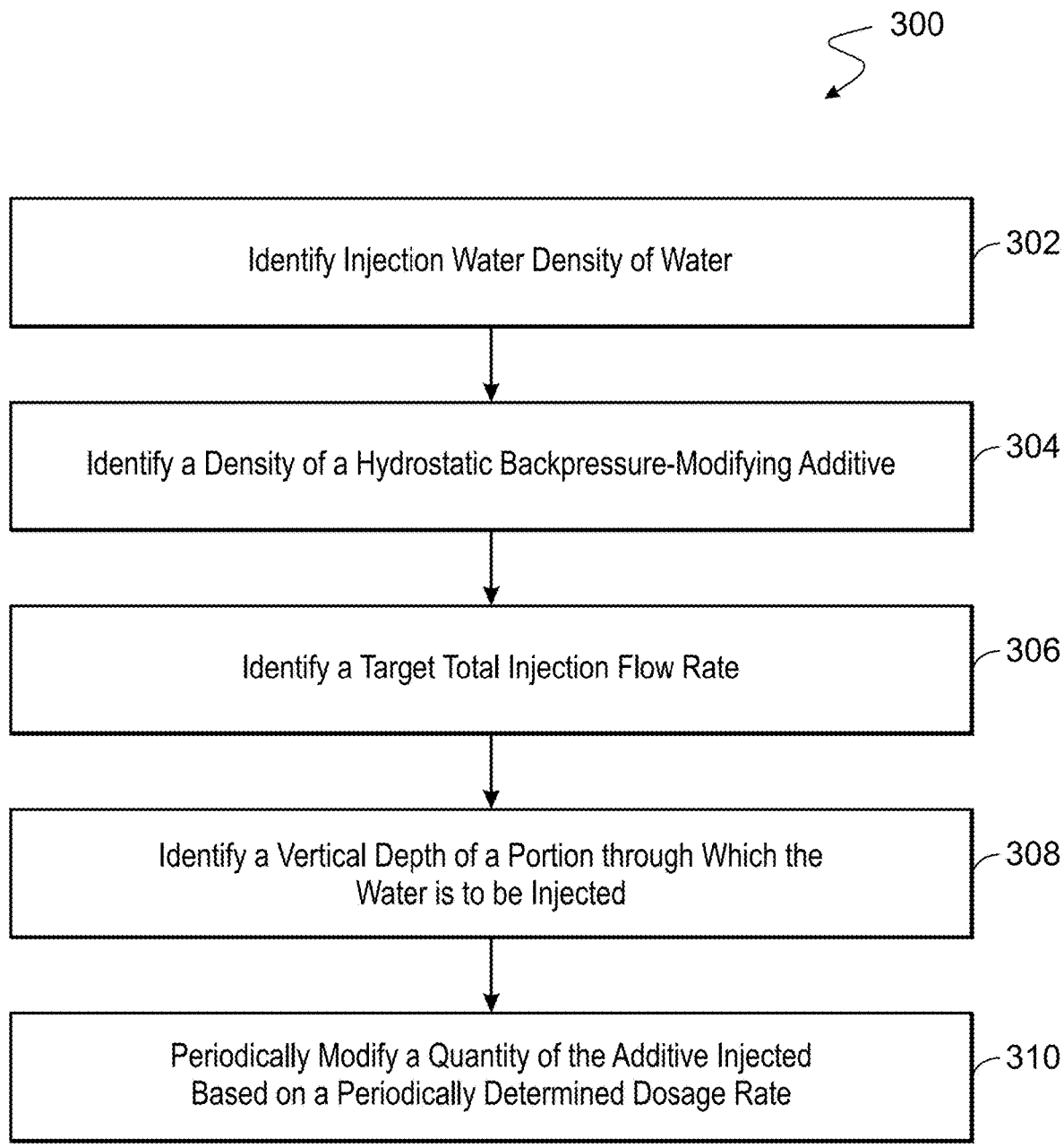
FIG. 3 is a flowchart of an example of a process of periodically modifying a quantity of an additive to be added to injection water.

FIG. 3 is a flowchart of an example of a process 300 of periodically modifying a quantity of an additive to be added to injection water. All or some of the steps of the process 300 can be implemented by the controller 106. Alternatively or in addition, all or some of the steps of the process 300 can be implemented by a combination of the controller 106 and the computer system that implements the workflow 200 described with reference to FIG. 2.

At 302, the computer system identifies injection water density of water ($\rho_w$) to be injected (or pumped) from a water disposal plant system (for example, the disposal plant 108) at a surface into multiple disposal wells, for example, the disposal wells 102a-102e included in the water disposal plant system, for example, the well and disposal plant systems described with reference to FIG. 1, and formed in a subterranean zone, for example, the formation 100. At 304, the computer system identifies a density ($\rho_o$) of a hydrostatic backpressure-modifying additive. The additive is configured to modify a density of the water to be injected. At 306, the computer system identifies a target total injection flow rate of the water to be injected. At 308, the computer system identifies a vertical depth ($D_v$) of a portion of the subterranean zone through which the water is to be injected.

At 310, the computer system periodically modifies a quantity of the additive injected based on a periodically determined dosage rate. In some implementations, while the water is being injected into the multiple disposal wells, the computer system periodically receives injected water flow rate ($q_w$) upstream of an injection point into the multiple disposal wells, wellhead injection pressure ($\Delta P_{ad}$) needed to achieve the target total injection flow rate and a total injection rate ($q_t$). Also, while the water is being injected into the multiple disposal wells, the computer system periodically determines a dosage rate ($q_0$) of the additive to maintain the target total injection flow rate using the total injection rate ($q_t$), the wellhead injection pressure ($\Delta P_{ad}$), the vertical depth ($D_v$), the injection water density ($\rho_w$) and the density ($\rho_0$) of the additive. Further, while the water is being injected, the computer system periodically modifies a quantity of the additive injected into the water based on the periodically determined dosage rate. As used in this disclosure, the term "periodically" means a frequency at which the operations are performed. The computer system can specify a default frequency, or the operator can set a default frequency, which can be modified during operation. The frequency can be, for example, once a minute, once every few minutes (for example, once every 2 minutes, once every 5 minutes, once every ten minutes), once an hour, once every few hours, or once any unit of time that the disposal plant operator deems suitable.

In some implementations, the computer system determines the dosage rate ($q_0$) of the additive using the following formula:

$$q_o = q_t \frac{\left[\frac{144 \Delta P_{ad}}{D_v} + \rho_w - \frac{\rho_w q_w}{q_t}\right]}{\rho_o}$$

The computer system can implement the formula as the equation presented above or as a spreadsheet. That is, in one example, the computer system can receive the input values from the sensors disposed throughout the disposal plant 108 and the wells, periodically determine, that is, compute, the dosage rate of the additive, and output signals to the flow components to adjust flow parameters to match the determined dosage rate. In another example, the computer system can store, for example, on a computer-readable medium, a table of dosage rate values for a range of input values. Upon receiving input values from the sensors, the computer system can identify an appropriate dosage rate from the table and output signals to the flow components to adjust flow parameters to match the determined dosage rate.

To modify the dosage rate, the flow components of the disposal plant 108 are operated, for example, by opening or closing a valve, increasing or decreasing pump flow rates, increasing or decreasing feed rates of the additive into the injection water, and so on. In some implementations, the controller 106 can transmit signals to the flow components of the disposal plant 108, the signals instructing the flow components to operate to achieve the determined dosage rate.

In some implementations, the computer system determines the dosage rate in real time. For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data.

Figure 4:
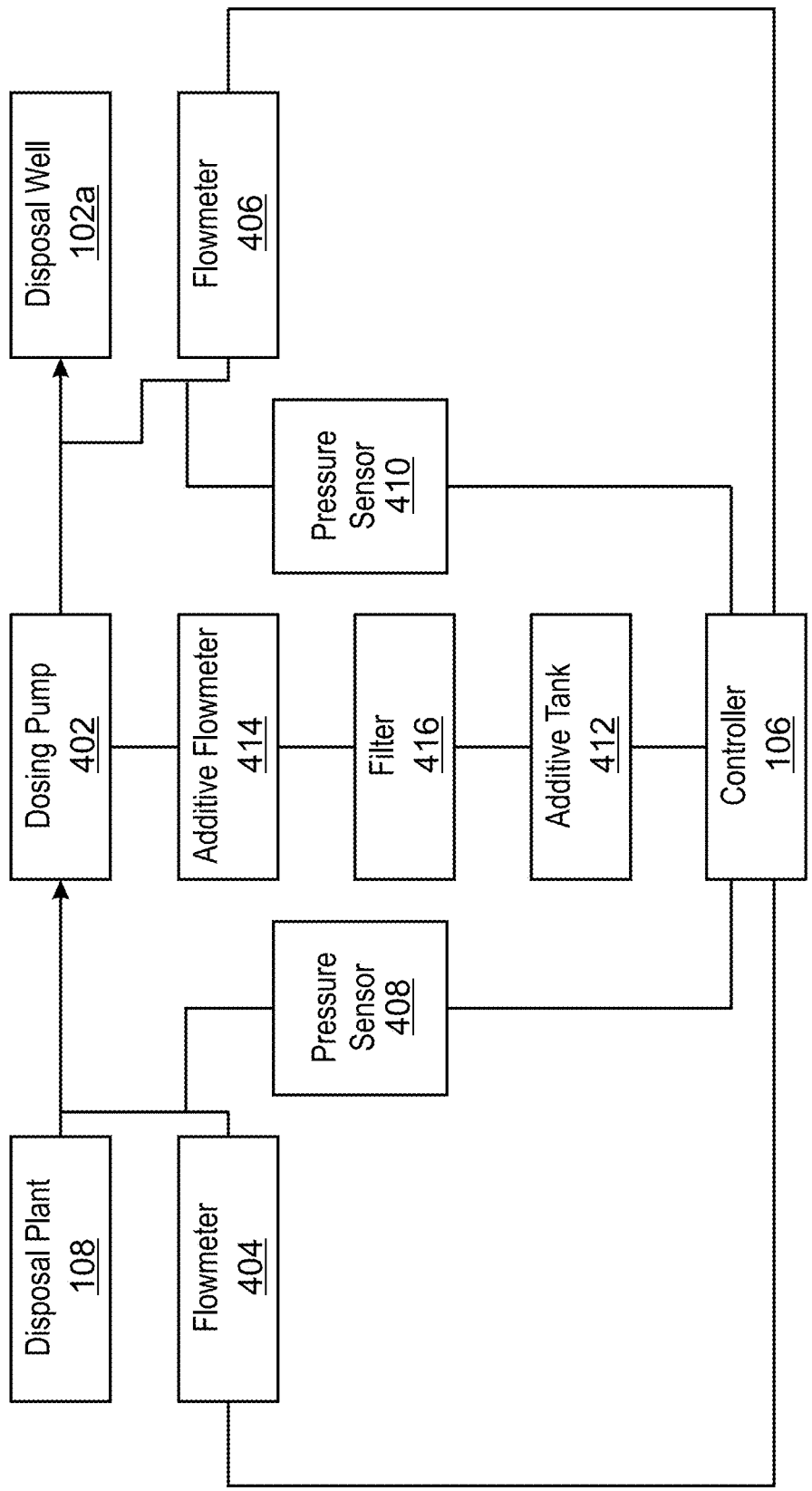
FIG. 4 is a schematic diagram of an example of controlling, using the controller, backpressure in a well fluid flowed from the disposal plant to a disposal well.

FIG. 4 is a schematic diagram of an example of controlling, using the controller 106, backpressure in a waste fluid flowed from the disposal plant 108 to a disposal well, e.g., the disposal well 102*a*. The components shown in and the operations described with reference to FIG. 4 can be implemented when flowing waste fluid from the disposal plant 108 to any of the disposal wells 102*a*-102*f*. Each well can include dedicated components implemented specifically for that well. Alternatively or in addition, the same component can be shared by different disposal wells. As described earlier, each component used to flow the well fluid from a disposal plant is connected to the controller 106.

In some implementations, the components used to flow waste fluid from the disposal plant 108 to the disposal well 102*a* includes a dosing pump 402 that can pump the waste fluid from the disposal plant 108 to the disposal well 102*a*. The dosing pump 402 can be operatively coupled to and controlled by the controller 106 such that the controller 106 can transmit instructions to modify the flow rate at which the dosing pump 402 flows the waste fluid from the disposal well 102*a* to the disposal plant 102*a*. A flowmeter 404 and a flowmeter 406 are fluidically connected to the disposal plant 108 and the disposal well 102*a*, respectively. Each flowmeter is also operatively coupled to the controller 106. The flowmeter 404 and the flowmeter 406 are configured to measure waste fluid flowrates at the disposal plant 108 and the disposal well 102*a*, respectively, and to transmit the measured flowrates to the controller 106. Similarly, a pressure sensor 408 and a pressure sensor 410 are fluidically connected to the disposal plant 108 and the disposal well 102*a*, respectively. Each pressure sensor is also operatively coupled to the controller 106. The pressure sensor 408 and the pressure sensor 410 are configured to measure waste fluid pressures at the disposal plant 108 and the disposal well 102*a*, respectively, and to transmit the measured pressures to the controller 106. The controller 106 is configured to determine a waste fluid flowrate at which the dosing pump 402 is to operate based on the received flowrates and pressures.

The components include an additive tank 412 operatively coupled to and configured to be controlled by the controller 106. The additive tank 412 stores a quantity of backpressure-reducing additive. The additive tank 412 can also be fluidically coupled to the dosing pump 402. The additive tank 412 can be operatively coupled to an additive pump (not shown) that can flow additive stored in the additive tank 412 to the dosing pump 402. In some implementations, based on the flowrates and pressures received from the flowmeters (404, 406) and the pressure sensors (408, 410), the controller 106 can determine a quantity of the backpressure-reducing additive to be added to the waste fluid being flowed from the disposal plant 108 to the disposal well 102a. The controller 106 can control the additive pump to flow the determined quantity of the additive from the additive tank 412 to the dosing pump 402. In some implementations, an additive flowmeter 414, operatively coupled to the controller 106, can be used to measure a flowrate or quantity (or both) of the additive being flowed to the dosing pump 402. In some implementations, a filter 416 can be fluidically disposed between the additive tank 412 and the dosing pump 402 to filter any solids in the additive.

Example

The table below shows an example where the pressure-reducing additive was used to increase the water injection rate to 5000 barrels per day and the wellhead injection pressure by 133 psi.

| Example HP Reducer Dosage Rate Calculation | | |
|---|---|---|
| Variable | Value | Unit |
| HP Reducer Chemical Dosage rate | 250.00 | bbl/day |
| HP Reducer Chemical Density | 120.00 | lbm/ft^3 |
| Injected Water Density | 62.40 | lbm/ft^3 |
| Targeted Water Injection flow rate | 5000.00 | bbl/day |
| Final Mixture Density | 65.14 | lbm/ft^3 |
| Final Mixture Gradient | 0.45 | Psi/ft |
| Reservoir Dept (ft TVD from CV) | 7000.00 | ft |
| Additional Injection Pressure | 133.33 | psi |

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   identifying, by a computer system, injection water density of water ($\rho_w$) to be injected from a water disposal plant system at a surface into a plurality of disposal wells included in the water disposal plant system and formed in a subterranean zone;
   identifying, by the computer system, a density ($\rho_0$) of a hydrostatic backpressure-modifying additive, the additive configured to modify a density of the water to be injected;
   identifying, by the computer system, a target total injection flow rate of the water to be injected;
   identifying, by the computer system, a vertical depth ($D_v$) of a portion of the subterranean zone through which the water is to be injected;
   while the water is being injected into the plurality of disposal wells:
   periodically receiving, by the computer system, injected water flow rate ($q_w$) upstream of an injection point into the plurality of disposal wells, wellhead injection pressure ($\Delta P_{ad}$) needed to achieve the target total injection flow rate and a total injection rate ($q_t$),
   periodically determining, by the computer system, a dosage rate ($q_0$) of the additive to maintain the target total injection flow rate using the total injection rate ($q_t$), the wellhead injection pressure ($\Delta P_{ad}$), the vertical depth ($D_v$), the injection water density ($\rho^w$) and the density ($\rho_0$) of the additive, and
   periodically modifying a quantity of the additive injected into the water based on the periodically determined dosage rate.

2. The method of claim 1, wherein the dosage rate ($q_0$) of the additive is determined using the following formula:

$$q_o = q_t \frac{\left[\frac{144 \Delta P_{ad}}{D_v} + \rho_w - \frac{\rho_w q_w}{q_t}\right]}{\rho_o}.$$

3. The method of claim 2, further comprising developing the formula by computationally modeling, using the computer system, fluid flow through the plurality of disposal wells.

4. The method of claim 3, wherein computationally modeling the fluid flow through the plurality of disposal wells comprises generating, by the computer system and for each disposal well, a respective inflow performance curve.

5. The method of claim 1, wherein the additive is ethylenediaminetetraacetic acid (EDTA) 30% weight solution.

6. The method of claim 1, wherein the additive is potassium dihydrogen phosphate ($KH_2PO_4$) 80% weight solution.

7. The method of claim 1, wherein modifying a quantity of the additive injected into the water comprises opening or closing a valve of a flow control system to flow or stop a flow of the additive into the water.

* * * * *

UNITED STATES PATENT AND TRADEMARK OFFICE
CERTIFICATE OF CORRECTION

PATENT NO. : 12,055,017 B2
APPLICATION NO. : 17/970057
DATED : August 6, 2024
INVENTOR(S) : Nasser Mubarak Al-Hajri and Abdulaziz Essam AlDughaither It is certified that error appears in the above-identified patent and that said Letters Patent is hereby corrected as shown below:

In the Claims

Column 12, Line 28, Claim 1, please replace "$(\rho^w)$" with -- $(\rho_w)$ --.

Signed and Sealed this
Twenty-fourth Day of September, 2024

Katherine Kelly Vidal
*Director of the United States Patent and Trademark Office*